(12) United States Patent
Kardamilas

(10) Patent No.: US 10,073,708 B2
(45) Date of Patent: Sep. 11, 2018

(54) SYSTEM AND METHOD OF PROVIDING VISUAL INDICATORS TO MANAGE PERIPHERAL DEVICES

(75) Inventor: Constantinos Kardamilas, Irvine, CA (US)

(73) Assignee: S-PRINTING SOLUTION CO., LTD, Suwon-si (KR)

(*) Notice: Subject to any disclaimer, the term of this patent is extended or adjusted under 35 U.S.C. 154(b) by 359 days.

(21) Appl. No.: 12/048,879

(22) Filed: Mar. 14, 2008

(65) Prior Publication Data

US 2009/0235175 A1    Sep. 17, 2009

(51) Int. Cl.
| | |
|---|---|
| G06F 9/451 | (2018.01) |
| G05B 19/418 | (2006.01) |
| G06Q 10/10 | (2012.01) |
| H04L 12/24 | (2006.01) |
| H04L 29/06 | (2006.01) |
| G06F 11/30 | (2006.01) |

(52) U.S. Cl.
CPC ............ *G06F 9/451* (2018.02); *G05B 19/418* (2013.01); *G06F 11/3055* (2013.01); *G06Q 10/10* (2013.01); *H04L 41/06* (2013.01); *H04L 41/22* (2013.01); *H04L 63/0209* (2013.01); *Y10S 715/969* (2013.01)

(58) Field of Classification Search
CPC ............... G05B 19/418; G06F 19/3406; G06F 11/3055; G06Q 10/10; H04L 41/06; H04L 41/22; H04L 63/0209; Y10S 715/969
USPC .................................. 715/736, 734; 714/4.5
See application file for complete search history.

(56) References Cited

U.S. PATENT DOCUMENTS

| | | | | |
|---|---|---|---|---|
| 5,261,044 | A | * | 11/1993 | Dev et al. ...................... 715/855 |
| 5,874,966 | A | | 2/1999 | Polimeni et al. |
| 6,054,987 | A | * | 4/2000 | Richardson ................... 715/734 |
| 6,072,489 | A | | 6/2000 | Gough et al. |
| 6,118,427 | A | | 9/2000 | Buxton et al. |
| 6,211,876 | B1 | * | 4/2001 | Ackermann ...... G06F 17/30675 704/239 |
| 6,426,761 | B1 | * | 7/2002 | Kanevsky ............. G06F 3/0481 715/764 |
| 6,560,639 | B1 | * | 5/2003 | Dan et al. ...................... 709/218 |
| 6,587,128 | B2 | | 7/2003 | Kanevsky et al. |
| 6,621,590 | B1 | * | 9/2003 | Livingston ............ G06F 3/1205 358/1.15 |
| 6,850,626 | B2 | * | 2/2005 | Rhoads et al. ................ 382/100 |
| 6,871,324 | B2 | * | 3/2005 | Hand et al. .................... 715/734 |
| 6,954,905 | B2 | | 10/2005 | Brown et al. |
| 6,990,601 | B1 | * | 1/2006 | Tsuneya et al. ............... 714/4.5 |
| 6,990,637 | B2 | | 1/2006 | Anthony et al. |

(Continued)

FOREIGN PATENT DOCUMENTS

JP    2006-195953    7/2006

OTHER PUBLICATIONS

Adobe Systems Incorporated, Adobe Acrobat 7.0 Professional, Sep. 23, 2005, version 7.0.5.*

*Primary Examiner* — Jeffrey A Gaffin
*Assistant Examiner* — John M Heffington
(74) *Attorney, Agent, or Firm* — Staas & Halsey LLP

(57) ABSTRACT

A system and method of providing visual indicators to manage peripheral devices is disclosed. In some embodiments, a graphical user interface environment is provided in which icons represent peripheral device objects. The appearance of the icons is modified based on attribute values associated with the device objects.

27 Claims, 13 Drawing Sheets

(56) References Cited

U.S. PATENT DOCUMENTS

| | | | |
|---|---|---|---|
| 7,013,324 B1* | 3/2006 | Sugano | G06F 17/30905 |
| | | | 707/E17.121 |
| 7,030,307 B2* | 4/2006 | Wedel | 84/477 R |
| 7,146,573 B2 | 12/2006 | Brown et al. | |
| 7,573,487 B1* | 8/2009 | Petersen | G06F 3/04817 |
| | | | 345/592 |
| 7,940,685 B1* | 5/2011 | Breslau et al. | 370/251 |
| 2005/0172239 A1* | 8/2005 | Liu | G06F 3/04817 |
| | | | 715/763 |
| 2006/0002531 A1* | 1/2006 | Kim | 379/100.01 |
| 2007/0016871 A1* | 1/2007 | Magnifico | G06F 17/30286 |
| | | | 715/764 |
| 2008/0137134 A1* | 6/2008 | Igarashi | G06F 21/608 |
| | | | 358/1.15 |
| 2009/0185814 A1* | 7/2009 | Willis | G03G 15/553 |
| | | | 399/27 |

\* cited by examiner

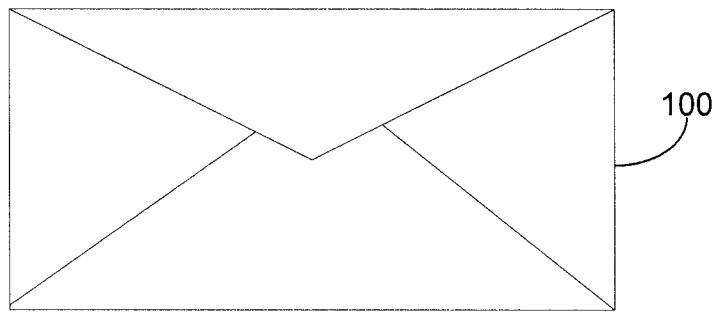
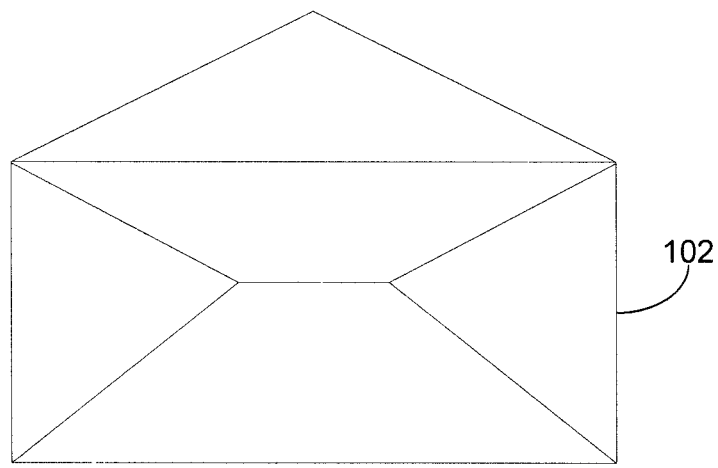
FIG. 1 (PRIOR ART)

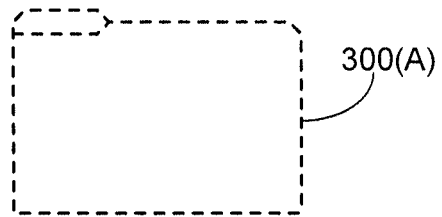
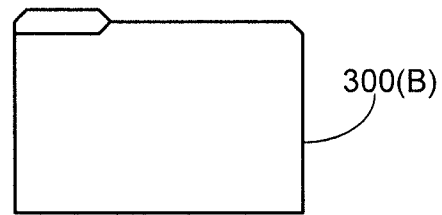
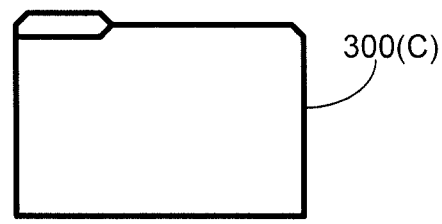
FIG. 3

FIG. 4A
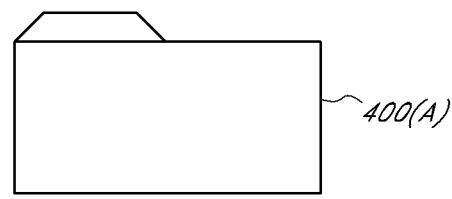
400(A)
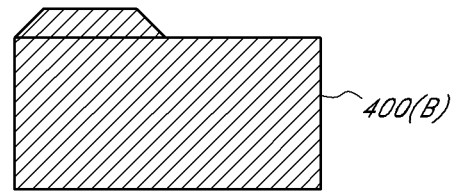
400(B)
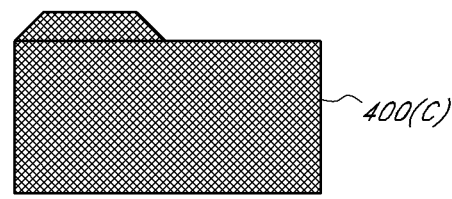
400(C)

FIG. 4B
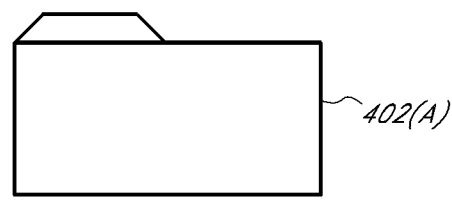
402(A)
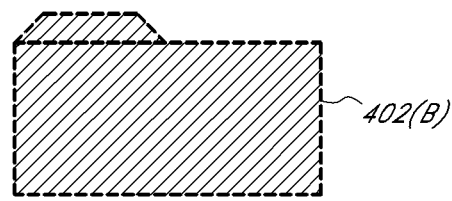
402(B)
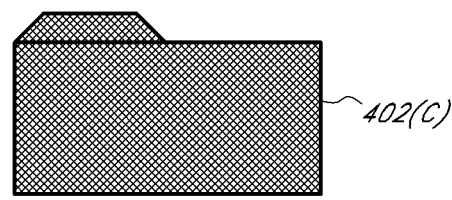
402(C)

FIG. 5
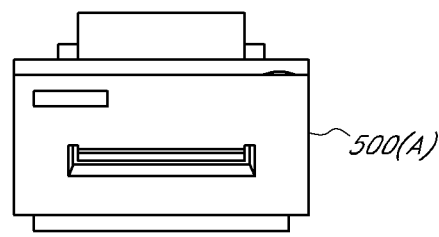
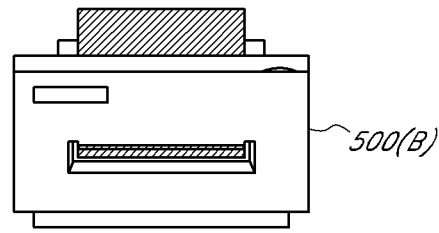
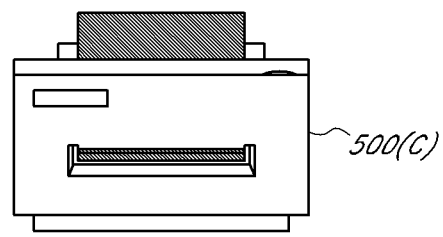

Shuttle Astronauts Complete Spacewalk

Sponsored By

AP
Updated: 6:06 AM ET Oct 26, 2007

HOUSTON - Astronauts using a robotic arm attached a bus-sized addition to the international space station Friday, with help from a pair of spacewalkers.

The live-in compartment carried up aboard shuttle Discovery - called Harmony - weighs nearly 16 tons and increases the space station's living and working area by more than 2,500 cubic feet.

"Now the crews that are hot on our heels have a place to come," spacewalker Scott Parazynski said.

He and Douglas Wheelock got the Italian-made Harmony ready for its move out of the shuttle cargo bay. Then Daniel Tani and Stephanie Wilson, working inside, used the station's robotic arm to slowly move Harmony toward its new home.

Earlier Friday, the spacewalkers removed a broken antenna from the station and packed it aboard Discovery for its return to Earth, and a giant girder ready for relocation later in the mission.

Shuttle Astronauts Complete Spacewalk

Sponsored By

AP
Updated: 6:06 AM ET Oct 26, 2007

HOUSTON - Astronauts using a robotic arm attached a bus-sized addition to the international space station Friday, with help from a pair of spacewalkers.

The live-in compartment carried up aboard shuttle Discovery - called Harmony - weighs nearly 16 tons and increases the space station's living and working area by more than 2,500 cubic feet.

"Now the crews that are hot on our heels have a place to come," spacewalker Scott Parazynski said.

He and Douglas Wheelock got the Italian-made Harmony ready for its move out of the shuttle cargo bay. Then Daniel Tani and Stephanie Wilson, working inside, used the station's robotic arm to slowly move Harmony toward its new home.

Earlier Friday, the spacewalkers removed a broken antenna from the station and packed it aboard Discovery for its return to Earth, and a giant girder ready for relocation later in the mission.

Shuttle Astronauts Complete Spacewalk

Sponsored By

AP
Updated: 6:06 AM ET Oct 26, 2007

HOUSTON - Astronauts using a robotic arm attached a bus-sized addition to the international space station Friday, with help from a pair of spacewalkers.

The live-in compartment carried up aboard shuttle Discovery - called Harmony - weighs nearly 16 tons and increases the space station's living and working area by more than 2,500 cubic feet.

"Now the crews that are hot on our heels have a place to come," spacewalker Scott Parazynski said.

He and Douglas Wheelock got the Italian-made Harmony ready for its move out of the shuttle cargo bay. Then Daniel Tani and Stephanie Wilson, working inside, used the station's robotic arm to slowly move Harmony toward its new home.

Earlier Friday, the spacewalkers removed a broken antenna from the station and packed it aboard Discovery for its return to Earth, and a giant girder ready for relocation later in the mission.

SYSTEM AND METHOD OF PROVIDING VISUAL INDICATORS TO MANAGE PERIPHERAL DEVICES

BACKGROUND OF THE INVENTION

Field of the Invention

This application relates to managing peripheral devices using visual indicators in graphical user interfaces. In particular, this application is related to the visual representation of objects, such as peripheral devices, in graphic user interface environments in order to visually convey information about the objects.

Description of the Related Technology

Existing graphical user interfaces (also referred to herein as "GUI's") often represent files and folders by displaying the name of file or folder textually within the GUI. Additional information about the file or folder such as the size, type, and date is often displayed alongside the icon. Existing GUI's also use static icons to represent files, directories, devices, and other artifacts. FIG. 1 provides an example of how static icons are typically used in the context of an e-mail application. As is known in the art, unopened e-mail messages are often represented by icons which take the appearance of an unopened envelope such as envelope 100. When the message is viewed by the user, the icon changes its appearance to that of an opened envelope 102. This allows the user to know that the state of the underlying object (the e-mail message) has changed from unopened to opened.

SUMMARY OF CERTAIN INVENTIVE ASPECTS

The system, method, and devices of the present invention each have several aspects, no single one of which is solely responsible for its desirable attributes. Without limiting the scope of this invention, several of its features will now be discussed briefly.

In one aspect, a method of conveying information about a plurality of peripheral device objects in a network peripheral device management application having a graphical user interface (GUI) environment is provided. The method includes receiving a selection of an attribute of the peripheral device objects to associate with a visual indicator. The visual indicator comprises a progressively modifiable aspect of an icon image. The icon image is indicative of one or more of the peripheral device objects. The method further includes associating the selected attribute with the visual indicator and retrieving selected attribute values for the plurality of peripheral device objects in the network. An icon image is generated for each of the peripheral device objects, wherein the visual indicator related to each generated icon image is modified based on a relative value within a range of the selected attribute values for the selected attribute of each peripheral device object. The generated icon images are displayed.

In another aspect, a system for configuring the display in a graphical user interface of images representing objects is provided. The system includes an object management application configured to display a plurality of configuration options, the configuration options including a plurality of visual indicators and a plurality of selectable attributes, the visual indicators comprising a progressively modifiable aspect of an image, the image being indicative of one or more of the objects. The object management application also receives a selection of at least one visual indicator to associate with one of the selectable attributes. The system also includes an object display application which is configured to retrieve the selected attribute values for a plurality objects and generate an image for each of the objects, wherein the visual indicator related to each generated image is modified based on a measured value of the selected attribute values for the selected attribute of each object. The generated images are displayed.

In still another aspect, a multi-function peripheral device is provided. The multi-function peripheral device includes an object management application which is configured to display a plurality of configuration options. The configuration options include a plurality of visual indicators and a plurality of selectable attributes. The visual indicators comprise a progressively modifiable aspect of an image. The image is indicative of one or more of the objects. The object management application is further configured to receive a selection of at least one visual indicator to associate with one of the selectable attributes. The multi-function peripheral device further includes an object display application configured to retrieve the selected attribute values for a plurality objects and generate an image for each of the objects, wherein the visual indicator related to each generated image is modified based on a measured value of the selected attribute values for the selected attribute of each object; and display the generated images.

BRIEF DESCRIPTION OF THE DRAWINGS

FIG. 1 is a prior art example of the use of static icons to represent changes in attributes of user interface objects.

FIG. 3 is one example of the application of visual indicators to a folder icon to change its appearance based on certain attributes.

FIGS. 4A and 4B are additional examples of the application of visual indicators to a folder icon to change its appearance based on certain attributes.

FIG. 5 is an example of the application of visual indicators to icons representing peripheral devices.

FIG. 6 is an example of the application of visual indicators to content in a document or text file.

FIGS. 7A, 7B, and 7C are examples of the application of visual indicators to web pages and hyperlinks.

FIG. 9 is an exemplary display screen for a device management application which utilizes visual indicators to convey information about objects.

DETAILED DESCRIPTION OF CERTAIN INVENTIVE EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

It has been recognized that existing GUI's lack the ability to effectively allow users to quickly ascertain detailed information about files, folders, and/or other objects in the user interface. Existing user interfaces require the user to carefully read and process information in order to learn detailed information about a file, folder, and/or other object represented in the GUI. For example, while the open and closed envelope icons (shown in FIG. 1) answer the simple question of whether the message has been previously opened by the user, they provide no additional information about the object they represent. This is because each icon is static in nature and does not change its appearance in response to user interaction with the particular e-mail message they represent.

Thus, while certain user actions (such as opening the e-mail message) result in the use of new or different static icons to represent a file, folder, and/or object, the existing graphical user interface environments do not provide icons which can visually convey detailed information about the files, folders, and/or objects which are represented. For example, the icons do not change to reflect that a particular e-mail has been frequently accessed by the user over time. Accordingly, various embodiments described herein allow users to quickly identify and recognize details about files, folders, and/or objects by providing visual indicators in the icons which represent them.

Figure 2:
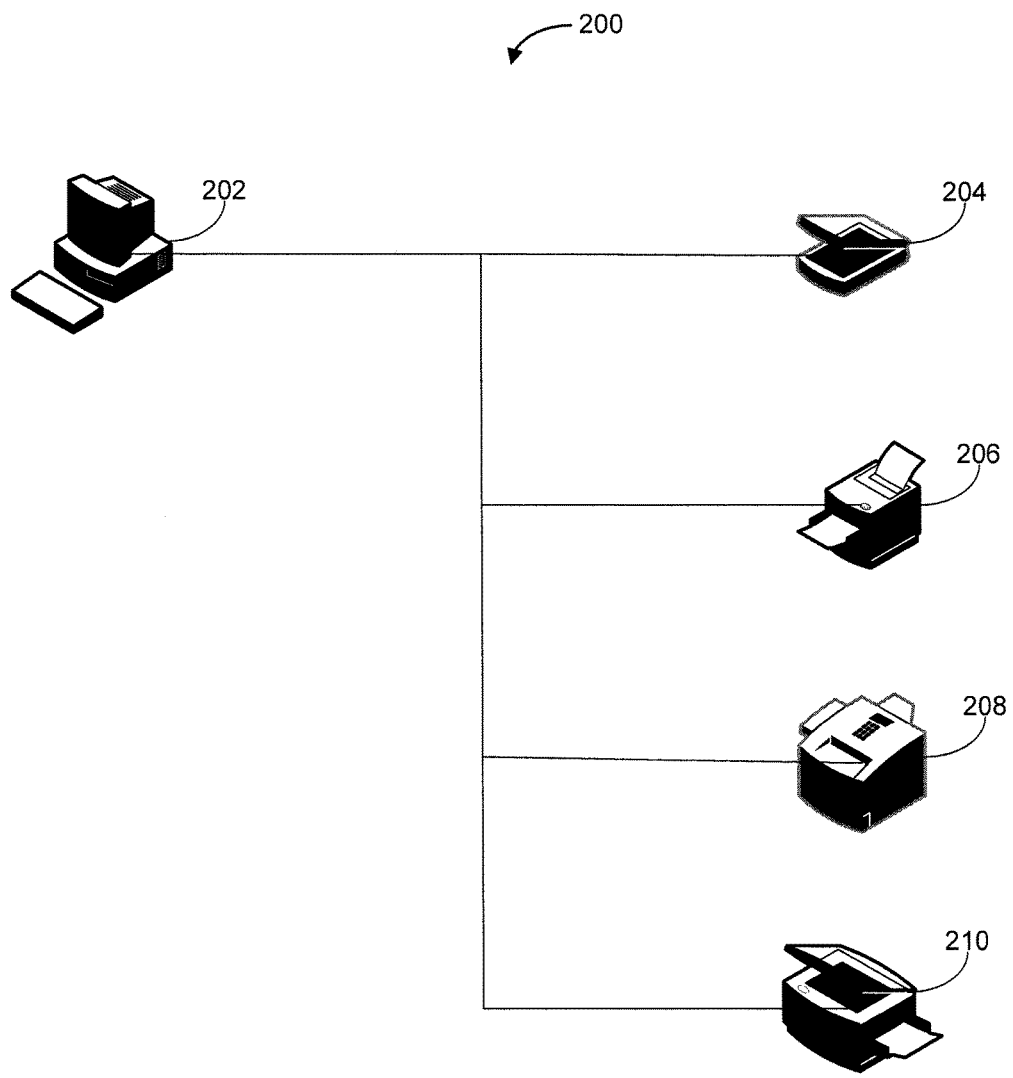
FIG. 2 is a network environment suitable for implementing certain embodiments.

Certain embodiments described herein relate to the use of visual indicators in the management of network peripheral devices. FIG. 2 illustrates one exemplary network environment 200 suitable for practicing certain embodiments described herein. The network environment 200 may include a wired network, a wireless network, or some combination of both wired and wireless networks. The network environment may further take the form of a wide area network (WAN), a local area network (LAN), or some combination of both. The environment 200 includes a workstation 202. The workstation 202 is typically a computer that runs an operating environment which includes software that displays a graphical user interface (GUI) on a display screen device of the workstation 202. The workstation may be a desktop computer, a laptop computer, a handheld computer, a tablet computer, a personal digital assistant device, a smart phone, or some other computing device. The workstation may run any of a number of different operating systems such as Windows®, Linux, MacOS®, Unix, or some other operating system having a graphical user interface environment. The workstation 202 is configured to manage the operation of peripheral devices connected to the network environment 200. The peripheral devices attached to the network environment 200 may include one or more network scanners 204. The network environment may further include one or more network printers 206. The network printers 206 may be laser printers or some other type of printer. Also connected to the network environment may be one or more multifunction peripheral devices (MFPs) 208. The MFPs 208 may include devices having the combined functionality of a plurality of peripherals such as printers, scanner, copies, fax machine, and other type of peripheral devices. The MFPs 208 includes an object management application configured to display a plurality of configuration options. The configuration options include a plurality of visual indicators and a plurality of selectable attributes with the visual indicators comprising a progressively modifiable aspect of an image. The image is indicative of one or more of the objects. The object management application is further configured to receive a selection of at least one visual indicator to associate with one of the selectable attributes. The MFPs 208 further includes an object display application configured to retrieve the selected attribute values for a plurality of objects. The object display application can be further configured to generate an image for each of the objects. The visual indicator related to each generated image is modified based on a measured value of the selected attribute values for the selected attribute of each object in displaying the generated images. The MFPs 208 include a storage device, a processing device, and a display screen device for storing, processing, and displaying based on the object management application and the object display application. The network environment 200 may further include a network copier 210.

As noted above, certain aspects of the invention provide for the use of visual indicators in icons themselves to convey information about objects represented by the icons without using any images or information additional to the visual indicator or displayed depiction of the icons themselves. FIG. 3 provides an example of how visual indicators may be used in connection with icons which represent file folders in an operating system. As shown in the figure, a file folder icon 300 gradually changes its appearance from a dashed outline state icon 300(A) to normal outline state icon 300(B) and then to a darkened outline state icon 300(C). In one embodiment, the change in appearance for the file folder icon 300 may be based on whether the file folder represented by the file folder icon 300 has been accessed frequently. For example, a file folder which has not been accessed frequently may be represented by the dashed outline state icon 300(A). A file folder which has been accessed with average frequency may be represented by the normal outline state icon 300(B). File folders which have been accessed frequently may be represented by the darkened outline state icon 300(C).

Other changes in appearance may be utilized to convey information about the objects represented by the icons. FIG. 4A provides an example of utilizing a gradual change in the shading of a file folder icon 400 to represent changes in the status of the file folder represented by the icon 400. As shown in the figure, the file folder icon 400(A) has a non-shaded appearance. This non-shaded appearance may be utilized to reflect infrequent access to the folder represented by the icon. The file folder icon 400(B) has a lightly-shaded appearance. This lightly-shaded appearance may be utilized to reflect a folder that has been accessed with average frequency. Similarly, the file folder icon 400(C) may have a strongly-shaded appearance to reflect that the file folder represented by the folder icon 400(C) has been frequently accessed. Naturally, shading may be replaced by coloring, such as the spectrum of the rainbow, or some other visually discernable technique and gradations of changes can be defined at any desired scale or resolution.

The frequency of access of a particular file may be measured numerically by the system. For example, one some embodiments, the frequency is expressed in terms of orders of magnitude such as 1, 10, 100, etc., where a 1-9 accesses constitute infrequent access, 10-99 accesses constitute ordinary frequency, and 100 or more accesses are considered frequent access. In some embodiments, the color of the icon may be varied continuously based on the attribute of the underlying object being considered. Using frequency of access as an example again, a color of the icon may be continuously varied from one color (blue, for example) to another color (red, for example) across the range of values with both endpoints being fully saturated.

In some embodiments, a combination of appearance changes may be utilized to convey information about different aspects related to the objects represented by the icons. For example, the changes in appearance provided in FIGS. 3 and 4A may both be applied to file folder icons simultaneously. By applying both changes in appearance, the icon may provide information about two different aspects of the object represented by the icon such as the frequency of access and the amount of data stored in the file folder.

FIG. 4B provides an illustration of how a file folder icon 402 may change two aspects of its appearance to provide visual indication relating to two separate aspects of the file folder. In this particular example, the first icon 402(A) combines a darkened outline state and a non-shaded state. The darkened outline state could be related to a high frequency of access for the file folder. The non-shaded state of the file folder icon 402(A) may be related to the amount of data stored in the folder. Thus, the icon 402(A) provides a visual indication that the folder has been frequently accessed, e.g., 1000 times accessed, but does not have a large amount of data stored therein, e.g., 50 kilobytes. Icon 402(B) combines a dashed outline state (as shown in icon 300(A) of FIG. 3) with a lightly-shaded appearance (as shown in icon 400(B) in FIG. 4A). This icon appearance provides a visual indication that the file folder represented by the icon has been accessed with low frequency, e.g., 5 times accessed (due to the dashed outline state), but stores an average amount of data, e.g., 2 megabytes (based on the lightly-shaded appearance). Icon 402(C) combines a normal outline state with a dark-shared appearance. This combined appearance provides a visual indication that the file folder represented by the icon has been accessed with normal frequency, e.g., 75 accesses (due to the normal outline state), but stores a large amount of data, e.g., 50 megabytes (based on the dark-shaded appearance).

It will be readily apparent to the skilled artisan that the visual indicators described in FIGS. 3, 4A, and 4B may be used to convey information about any number of different aspects of the objects represented by the icons. Moreover, the icons need not necessarily be file folder icons, but may be icons in a graphical user interface which represent other types of objects such as files, devices, shortcuts, and the like. For example, the visual indicators may be used to convey information relating to user permissions to a file or folder represented by the icon, the duration that a particular file has been opened, the ages of the object, or some other detail about the object. In one particularly useful example, the visual indicators are used in the context of managing peripheral devices in a computer network.

FIG. 5 is an example of a how visual indicators may be applied to icons which represent peripheral devices in a network. An icon such as printer icon 500 may be used to represent a printer device within a network of peripheral devices. As will be discussed in additional detail below, printer icons may be used to represent devices in a device network management utility. The printer icon 500 may be modified to provide a visual indicator related to the status of the printer as shown in FIG. 5. The printer icon 500 may be presented to the user in a non-shaded state 500(A) which may indicate, for example, that the printer has been online for a short period of time, e.g., less than 24 hours. As the time a printer is online increases, the printer icon 500 may be adjusted to a partially-shaded state 500(B) which indicates that the printer has been online for a longer duration, e.g., one week. As the printer remains online for an even longer duration, the printer icon 500 which represents the printer may be given a strongly-shaded appearance to provide a visual indication that the printer has been online for a longer duration, e.g., one month or more.

In other embodiments, the visual indicators may be applied to portions of documents to visually convey information about that portion of the document. FIG. 6 provides an illustration of how visual indicators may be applied to portions of a document to provide information about a document 600 being displayed within an application. The application may be configured to collect information relating to how a user interacts with the document 600 by tracking the frequency with which pages, paragraphs, or sections of the document 600 are accessed by the user. For example, a visual indicator may be provided to indicate that a user has accessed a particular paragraph, page, or section in the document with regularity. The visual indicator may be a watermark, a background modification, a text modification, or some other type of visual indicator. The appearance of the visual indicator may be changed to reflect the relative or absolute frequency with which the user has accessed a particular section. For example, in the document page 600 provided in FIG. 6, a visual indicator 602 is provided to indicate that the lightly-shaded paragraph has been referred to and/or modified by the user frequently. As the user continues to refer to and/or modify the paragraph, the visual indicator may be modified by progressively darkening the shading in direct relation to the frequency of access. The paragraph 604 shown in the figure is an example of a greater degree of interaction between the user and a portion of the document page 600. Of course, the modification of the shading could also be discontinuous with step increments that apply different indicators to ranges of values.

In still another embodiment, a visual indicator may be provided to convey information about a webpage. For example, a visual indicator may be applied to a webpage to convey a visual indication to the user that the webpage has been previously visited by the web browser. Referring now to FIGS. 7A, 7B, and 7C an example of such an application of a visual indicator is provided. As shown in FIG. 7A, a webpage 700(A) appears with a clear background when it has not been previously visited by the user. If the user subsequently accesses the same webpage a second time, the background may be modified to indicate that the page has been accessed before, as shown by the shaded background of the webpage 700(B) in FIG. 7B. If the user subsequently accesses the same webpage a third time, the degree of shading of the background of the webpage may be further darkened to reflect additional visits as shown in the background 700(C) in FIG. 7C. The web browsing software may be configured to track and record the user's page visits to provide the information used to determine whether to apply a visual indicator to the webpage.

Figure 8:
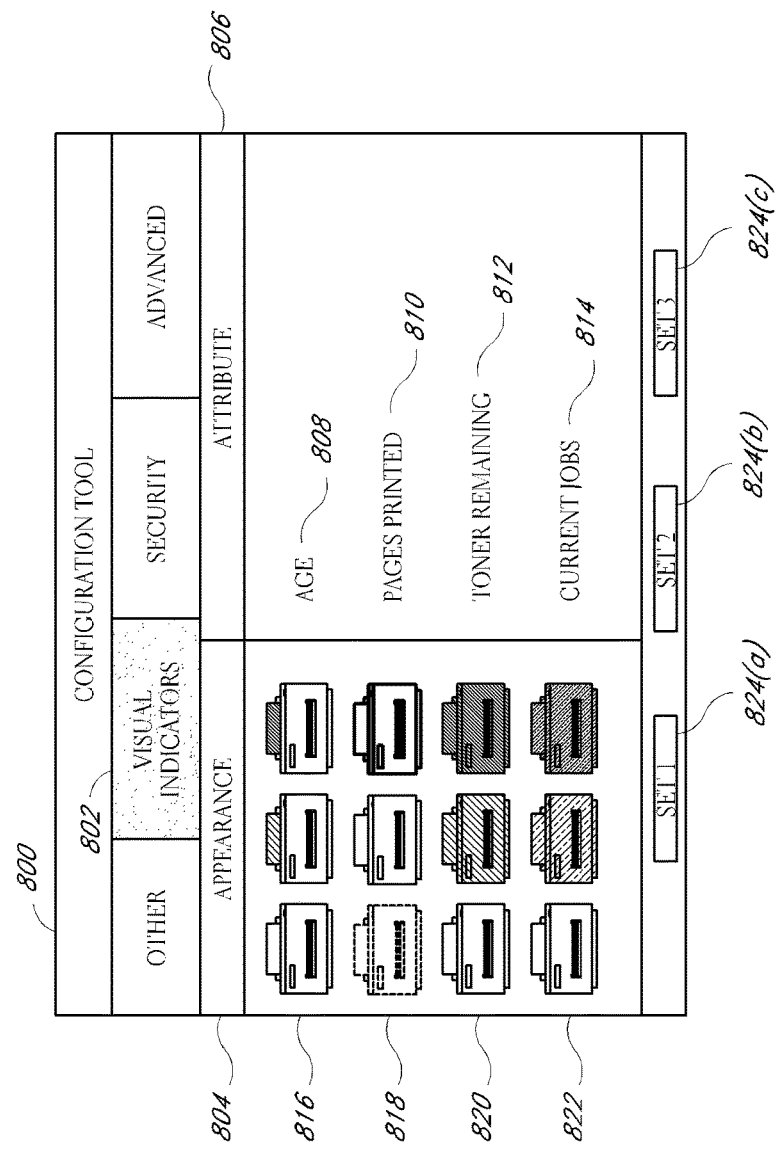
FIG. 8 is an exemplary display screen for a configuration application which may be used to select visual indicators to apply to objects.

In some embodiments, a configuration application may be provided which allows the user to specify how visual indicators may be applied within certain computer applications. The configuration application may be implemented as a software application that is stored in a storage device within a computing device such as the workstation 202 in the network environment 200 from FIG. 2. FIG. 8 illustrates an exemplary interface for a configuration application 800. The configuration application 800 may be used to change the appearance of icons representing networked peripheral devices in a network peripheral management application. The configuration application 800 includes a visual indicators tab 802. As shown in the figure by its shaded appearance, the visual indicators tab 802 has been selected by the user. Selection by the user of the visual indicators tab 802 may cause the configuration application 800 to display an icon appearance column 804 and an attribute column 806.

The icon appearance column 804 includes the various types of visual indicator appearances that may be applied to icons in the application. In the example provided in FIG. 8, the visual indicator appearances include various different types of visual indicators which may be selected. For example, the user may select a shaded appearance indicator 816 in which the icon becomes progressively darker based on changes in the value of the attribute with which it is associated. The user may also select an outline-based indicator 818 which gradually thickens the exterior outline of the icon based on changes in the value of the attribute with which the outline-based indicator is associated. Other selectable visual indicator appearances are available as shown with indicators 820 and 822.

The attribute column 806 lists the various object attributes that may be associated with the visual indicators listed in the icon attribute appearance column 804. In the example provided, the attributes are related to network peripheral devices. The attributes may include an age attribute 808 which measures amount of time a network peripheral has been running on the network. The attribute column 806 may also include a pages printed attribute 810. The pages printed attribute 810 is a measurement of the number of pages a particular network device has printed. This information may be useful for determining that a particular device is likely to begin to fail based on having printed a large number of pages. This information may also be useful for determining that certain printers within the network are subject to disproportionately heavy use and should be redistributed to ensure more even wear among the network peripheral devices. The attributes may further include a toner remaining attribute 812. The toner remaining attribute 812 is a measurement of the amount of toner still available in a particular network peripheral device. This information allows the user to anticipate when a toner cartridge may need to be replaced within the network and prevent users from having printer down time. A current jobs attribute 814 may also be provided. The current jobs attribute 814 typically measures the number of active and/or queued jobs in a particular network peripheral device.

A user may select one or more of the appearances from the appearance column 804 and associate it with one or more of the attributes from the attribute column 806. In the example provided, three association interface elements 824(a), 824(b) and 824(c) are provided to allow the user to create three different appearance/attribute associations. Thus, the user may select one of the appearances (such as shaded appearance 816, for example) and then select one of the attributes (such as toner remaining 812, for example). In order to create the association, the user may then actuate the first association interface element 824(a) to create the association. In the embodiment shown, two additional associations may be created by the user by selected the second association interface element 824(b) and the third association interface element 824(c), respectively.

Figure 9:
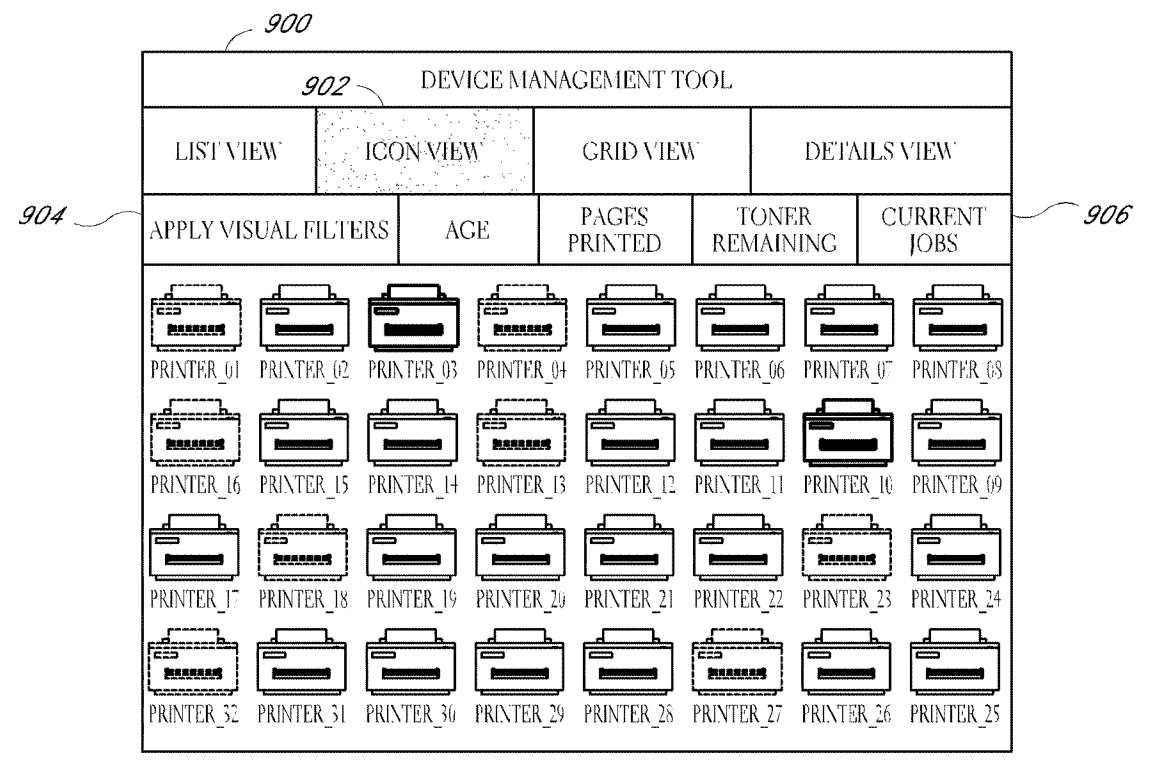

FIG. 9 illustrates an exemplary user interface for the peripheral device management application after the user has selected an appearance/attribute association using the configuration application 800 illustrated in FIG. 8. As shown in the figure, the peripheral device management application 900 includes a view selection menu 902 which allows a user to select how the managed devices are displayed within the application. For example, the user may select a list view which lists the devices without any icons. Selection of the list view may result in the list view element in the management application being highlighted. Similarly, the user may select an icon view which displays the devices in the network as icons. The example shown in FIG. 9 has the icon view selected, as is evident from its highlighted appearance, resulting in the network peripheral devices being displayed as icons to the user.

When the icon view is selected by the user, a visual indicator submenu 904 may be displayed. The user may then select one of the available visual indicator options. These options may be generated based on associations created by the user utilizing the configuration application 800 described with reference to FIG. 8 above. Alternatively, the visual indicators available for selection from the visual indicator submenu may be preconfigured without user input. In the illustrated example, the "pages printed" option has been selected, as indicated by its highlighted appearance, meaning that the visual appearance of the icons will be gradually changed based on the number of pages that the device has printed over time. For example, the peripheral device labeled "PRINTER_01" has a very light outlined appearance, thereby indicating that it is printed a relatively small number of pages. Other devices, such as "PRINTER_14" and "PRINTER_28" have a slightly more defined outline appearance, thereby indicating that these devices have printed more pages than "PRINTER_01". The outline definition of the icons becomes progressively darker as the number of pages printed by the associated printer increase. Accordingly, the devices represented by the icon labeled "PRINTER_22" and has an even larger pages printed value, as indicated by a darker outline appearance. Those devices, such as "PRINTER_10" and "PRINTER_03" having the darkest icon outlines, are those which have printed the most pages.

Figure 10:
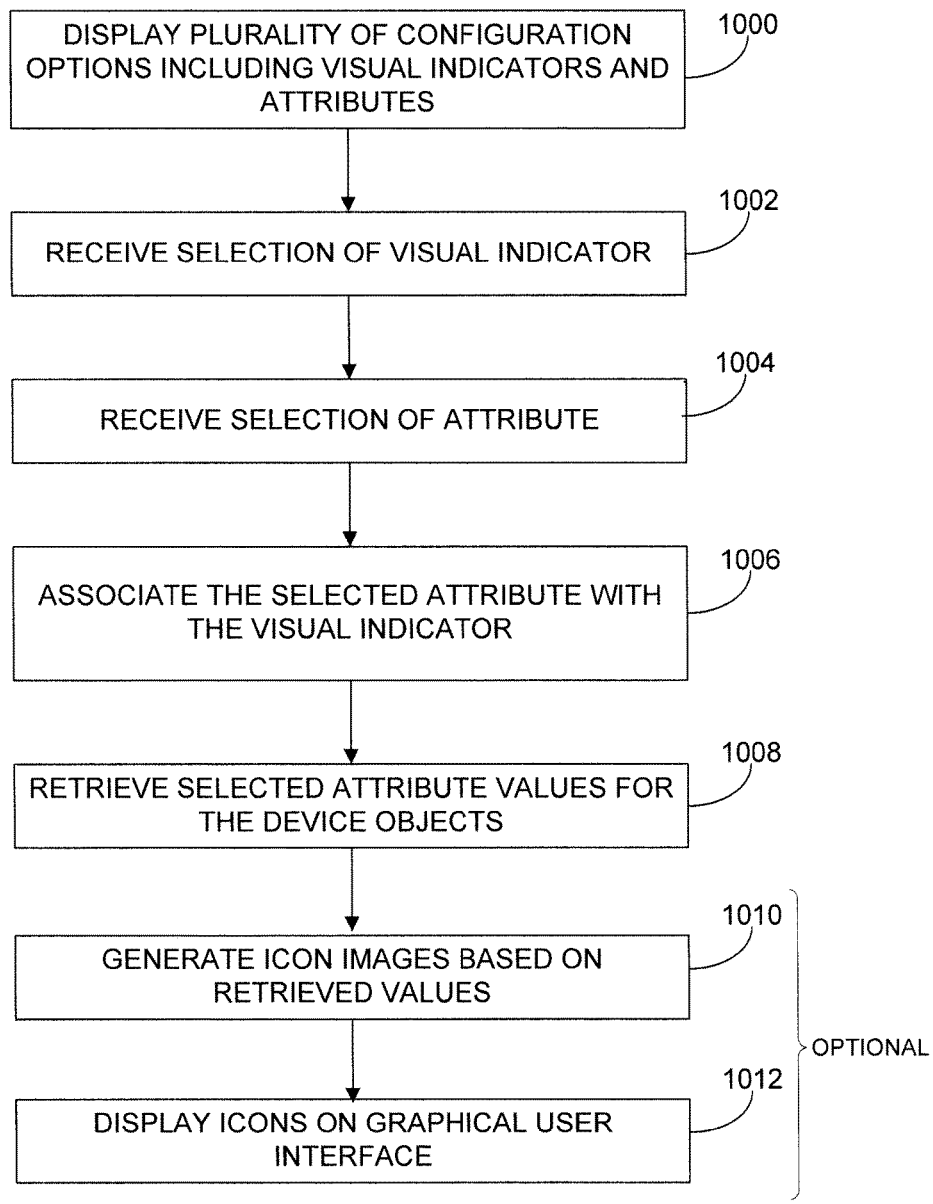
FIG. 10 is a flowchart of a method of conveying information about a plurality of peripheral device objects in a network peripheral device management tool.

Referring now to FIG. 10, a flowchart illustrates one example of how a peripheral device management application may generate the visual indicators applied to the device icons in FIG. 9. The peripheral device management application may be a stand-alone application, or it may be part of (e.g., a function) an operating system, a file system, or some other software application. The process begins at block 1000, where the peripheral device management application displays plurality of configuration options including visual indicators and attributes. Next at block 1002, receives a selection of a visual indicator to apply to the device icons in the application. Next, at block 1004, a selection of an attribute is received. An association is then created between the selected attribute and the selected visual indicated at block 1006.

Next, at block 1008, the device management application retrieves the device values for the selected attribute. For example, if the toner remaining attribute 812 has been selected in the configuration application 800, the device management application 900 retrieves the amount of toner remaining from each peripheral device in the network. The process then continues to block 1010, where the icon appearance for the highest value and the visual indicator appearance for the lowest value are assigned to the object. Typically, the visual indicator appearance for the highest value object attribute will have the highest visual intensity and/or impact. The device that has the lowest object attribute value typically is assigned a visual indicator appearance having the lowest visual intensity and/or impact. The remaining devices having object attribute values between the highest and the lowest are then assigned appearances as a function of their relative value within the range of values at block 1010. Once each of the icon appearances has been defined, the icons are generated and rendered on the graphical user interface display at block 1012. Blocks 1010 and 1012 may be considered as optional parts of the process shown in FIG. 10, as in some embodiments, the display functionality may be performed within another system or application program.

It will be understood by those of skill in the art that numerous and various modifications can be made without departing from the spirit of the present invention. Therefore, it should be clearly understood that the forms of the invention are illustrative only and are not intended to limit the scope of the invention. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention.

What is claimed is:

1. A method of conveying information about peripheral device objects, the method comprising:
    displaying a plurality of attributes corresponding to state information of one or more of the peripheral device objects;
    displaying, simultaneously with displaying the plurality of attributes, a plurality of types of visual indicator appearances as potential appearances of an icon image to be generated, each type of visual indicator appearance being progressively modifiable in an intensity of appearance thereof according to a value of a selected attribute among the plurality of attributes corresponding to state information of the one or more peripheral device objects, wherein each type of visual indicator appearance is displayed according to at least three visual indicator appearance values corresponding to values of the selected attribute among the plurality of attributes corresponding to state information of the one or more peripheral device objects;
    receiving a visual indicator selection selecting a type of the visual indicator appearance among the displayed plurality of types of visual indicator appearances and receiving an input selecting an attribute among the plurality of attributes;
    creating a selection association between the selected attribute, the visual indicator selection, and the icon image;
    retrieving, from the one or more peripheral device objects, a measurement value for the selected attribute for representing the measurement of the selected attribute;
    generating the icon image according to the selection association and the retrieved measurement value, such that the appearance of the icon image corresponds to the visual indicator selection progressively modified in intensity to represent the measurement value of the selected attribute; and
    displaying the generated icon image.

2. The method of claim 1, wherein receiving the visual indicator selection includes receiving a selection of the type of the visual indicator appearance among the displayed plurality of types of visual indicator appearances.

3. The method of claim 2, wherein generating the icon image includes incrementally modifying a color intensity of the icon image.

4. The method of claim 2, wherein generating the icon image includes incrementally modifying an intensity of an outline of the icon image.

5. The method of claim 1, wherein the one or more peripheral device objects comprise network printers.

6. The method of claim 5, wherein the selected attribute comprises at least one of a pages printed value of the one or more peripheral device objects, a current jobs attribute value of the one or more peripheral device objects, or a toner level value of the one or more peripheral device objects.

7. The method of claim 1, wherein generating the icon image includes incrementally modifying the icon based on a relative value within a predefined range of values for the selected attribute of each peripheral device object.

8. The method of claim 1, wherein generating the icon image includes incrementally modifying a hue saturation of the icon.

9. The method of claim 1, wherein generating the icon image includes incrementally modifying a shape of the icon.

10. The method of claim 1, wherein the selected attribute comprises one or more of an age of the object, a frequency of access made to the object, and the duration the object remains in an open state.

11. The method of claim 1, wherein the information about the one or more peripheral device objects is conveyed in a network peripheral device management application.

12. The method of claim 11, wherein the network peripheral device management application includes a graphical user interface (GUI) environment.

13. A system of conveying information about objects comprising:
    a storage device within a workstation to store:
        a plurality of attributes corresponding to state information of one or more objects,
        a selected attribute corresponding to an input selecting an attribute among the plurality of attributes,
        a plurality of types of visual indicator appearances corresponding to potential appearances of an image to be generated, each type of visual indicator appearance being progressively modifiable in an intensity of appearance thereof according to a value of the selected attribute among the plurality of attributes corresponding to state information of the one or more objects, wherein each type of visual indicator appearance is displayable according to at least three visual indicator appearance values corresponding to values of the selected attribute among the plurality of attributes corresponding to state information of the one or more objects,
        a visual indicator selection selected from the plurality of types of visual indicator appearances,
        a selection association created based on the selected attribute, the visual indicator selection, and the image, and
        a measurement value of the selected attribute; and
    a display screen device of the workstation to:
        display the plurality of attributes corresponding to state information of the one or more objects for selecting the selected attribute,
        display, simultaneously with displaying the plurality of attributes, the plurality of types of visual indicator appearances for selecting the visual indicator selection as potential appearances of the icon image to be generated, wherein each type of visual indicator appearance is displayed according to the at least three visual indicator appearance values corresponding to values of the selected attribute, and
        display the image according to the selection association and the measurement value, such that the appearance of the image corresponds to the visual indicator selection progressively modified in intensity to represent the measurement value of the selected attribute.

14. The system of claim 13, wherein the one or more objects are network printers.

15. The system of claim 13, wherein the image is an icon image.

16. The system of claim 15, wherein a color intensity of the icon image is progressively modified according to the value of the selected attribute related to the one or more objects.

17. The system of claim 15, wherein an intensity of an outline of the icon image is progressively modified according to the value of the selected attribute related to the one or more objects.

18. The system of claim 13, wherein at least one of the one or more objects comprises a network device in communication with the system.

19. The system of claim 18, wherein the selected attribute comprises a period of time the network device has been in operation.

20. The system of claim 13, wherein
the one or more objects comprise portions of a document file, and
the selected type of visual indicator appearance comprises watermarks embedded in the document.

21. The system of claim 20, wherein the selected attribute comprises a measurement of respective frequencies of which the portions of the document file have been accessed.

22. The system of claim 20, wherein the portions of the document file comprise pages of the document file.

23. The system of claim 20, wherein the portions of the document file comprise paragraphs of the document file.

24. The system of claim 20, wherein the document file is an HTML file.

25. The system of claim 20, wherein the selected attribute comprises a measurement of frequencies of modifications for the portions of the document file.

26. A multi-function peripheral device, comprising:
a storage device within the multi-function peripheral device to store a selection association between:
an attribute, selected via a user input among a plurality of attributes, corresponding to state information of one or more objects associated with the multi-function peripheral device,
an image to be generated for representing the state information of the one or more objects, and
a type of a visual indicator appearance selected from among a plurality of types of visual indicator appearances, the plurality of types of visual indicator appearances corresponding to potential appearances of the image to be generated, each type of visual indicator appearance being progressively modifiable in an intensity of appearance thereof according to a value of the attribute corresponding to state information of the one or more objects, wherein each type of visual indicator appearance is displayable according to at least three visual indicator appearance values corresponding to values of the attribute corresponding to state information of the one or more objects; and
a display screen device of the multi-function peripheral device to:
display the plurality of attributes corresponding to state information of the one or more objects for selecting the attribute,
display, simultaneously with displaying the plurality of attributes, the plurality of types of visual indicator appearances for selecting the type of visual indicator appearance as potential appearances of the icon image to be generated, wherein each type of visual indicator appearance is displayed according to the at least three visual indicator appearance values corresponding to values of the selected attribute, and
display the image according to the selection association and a measured value of the attribute, such that the appearance of the image corresponds to the selected type of visual indicator appearance progressively modified in intensity to represent the measured value of the attribute.

27. The multi-function peripheral device of claim 26, wherein the multi-function peripheral device comprises at least two of a scanner, fax machine, printer, telephone, or a modem.

* * * * *